United States Patent [19]

Maeda et al.

[11] Patent Number: 5,292,473

[45] Date of Patent: Mar. 8, 1994

[54] PROCESS FOR PREPARING PITCH FOR MATRIX

[75] Inventors: Takashi Maeda; Toshifumi Kawamura, both of Kashima, Japan

[73] Assignee: Petoca, Ltd., Tokyo, Japan

[21] Appl. No.: 10,007

[22] Filed: Jan. 27, 1993

[30] Foreign Application Priority Data

Jan. 31, 1992 [JP] Japan ................. 4-040667

[51] Int. Cl.$^5$ ............ D01F 11/10; D01F 11/12; D01F 11/14
[52] U.S. Cl. ................. 264/183; 264/211.11; 264/211.17
[58] Field of Search ............ 264/29.2, 29.6, 183, 264/211.11, 211.14, 211.17; 423/447.4, 447.7

[56] References Cited

U.S. PATENT DOCUMENTS

| | | | |
|---|---|---|---|
| 4,487,685 | 12/1984 | Watanabe | 208/44 |
| 4,512,874 | 4/1985 | Watanabe | 208/44 |
| 4,529,498 | 7/1985 | Watanabe | 208/44 |
| 4,529,499 | 7/1985 | Watanabe | 208/44 |
| 4,534,950 | 8/1985 | Uemura et al. | 423/447.4 |
| 4,606,872 | 8/1986 | Watanabe | 264/29.2 |
| 4,814,121 | 3/1989 | Watanabe | 264/29.2 |
| 4,873,071 | 10/1989 | Yamada et al. | 423/448 |
| 4,892,722 | 1/1990 | Suto et al. | 423/448 |
| 4,898,723 | 2/1990 | Suto et al. | 423/447.4 |
| 4,913,889 | 4/1990 | Takai et al. | 423/447.1 |
| 4,975,261 | 12/1990 | Takabatake | 423/445 |
| 4,975,262 | 12/1990 | Suto et al. | 423/447.1 |
| 5,004,511 | 4/1991 | Tamura et al. | 156/89 |
| 5,035,942 | 7/1991 | Nagata et al. | 428/288 |
| 5,071,631 | 12/1991 | Takabatake | 423/445 |
| 5,091,164 | 2/1992 | Takabatake | 423/445 |

FOREIGN PATENT DOCUMENTS

| | | |
|---|---|---|
| 63-139080 | 6/1988 | Japan. |
| 2-27302 | 1/1990 | Japan. |
| 3-169339 | 7/1991 | Japan. |

*Primary Examiner*—Leo B. Tentoni
*Attorney, Agent, or Firm*—Oblon, Spivak, McClelland, Maier & Neustadt

[57] ABSTRACT

A process for preparing pitch for matrix wherein an optically isotropic pitch is formed into a fibrous pitch, and the fibrous pitch thus obtained is nitrated with a nitration reagent in the presence of an acid catalyst. The resulting pitch can be carbonized with a low energy, is high in carbonization yield, low in softening point and excellent in moldability and impregnability.

4 Claims, No Drawings

PROCESS FOR PREPARING PITCH FOR MATRIX

FIELD OF THE INVENTION

This invention relates to a process for preparing pitch for matrix and more particularly to the process for preparing such pitch for matrix as being low in temperature at which the thermopolymerization of said pitch for matrix is initiated and capable of increasing a yield of carbonization of said pitch for matrix.

BACKGROUND OF THE INVENTION

Generally, pitch for matrix is used for the preparation of carbon materials, for example, by impregnating carbonaceous materials such as carbon fiber, porous carbonaceous material and the like with said pitch for matrix, followed by thermopolimerizing in an inert atmosphere.

Such pitch for matrix as mentioned above is desired to have a high flowability at the time when it is heated for impregnation and also desired to be carbonized in a high yield during the thermopolymerization thereof.

In this connection, there has heretofore been made an attempt to increase the yield of carbonization of pitch for matrix by air oxidation, such as air blow, of the starting pitch consisting essentially of an aromatic compound in its molten state. According to this method, however, there is involved such a problem that it is difficult to obtain uniform carbon materials having excellent characteristics, because the oxidation reaction of the starting pitch is slow in progress owing to insufficient contact of the pitch with oxygen and said oxidation reaction does not proceed uniformly.

A method is also known to pulverize the starting pitch or mold the starting pitch into a fiber form, followed by air oxidation thereof. In this method, however, involved is such a problem that when the carbonization yield of the starting pitch is increased by means of sufficient oxidation, the oxidized pitch does not melt so as to flow and, on the other hand, when the oxidation of said starting pitch is limited to such an extent that the pitch melts to flow, the carbonization yield of the starting pitch does not increase sufficiently.

Known also is a technique to obtain petroleum resin or phenol resin suitable for use in coating materials, adhesives, pressure-sensitive adhesives, casting materials, sealing materials and the like by oxidation polymerization of the starting aromatic compound in the presence of a crosslinker such as formaldehyde and an acid catalyst. And though it may be presumable that such petroleum resin or phenol resin as referred to above is used as a raw material for the preparation of carbon materials, it is difficult to obtain desired carbon materials in a high carbonization yield.

By the way, Japanese Patent L-O-P Publn. No. 139080/1988 discloses a process for producing graphite, which comprises treating carbonaceous mesophase or coke with nitric acid or a mixed acid of nitric acid and sulfuric acid, followed by heating at a temperature of at least 2400° C. Further, Japanese Patent L-O-P Publn. No. 169339/1991 discloses a process for producing carbonaceous adsorbents having micro pores, which comprises treating a mesophase obtained by heat treatment of pitch at at least about 350° C. or a coke with nitric acids or a mixed acid of nitric acid and sulfuric acid, and eluting insolubles out of the carbon material by the treatment with a solvent, followed by the heat treatment of the thus treated product at 300°–1400° C. The above-cited publications, however, fail to disclose a process for preparing pitch for matrix excellent in impregnating properties and the like.

Further, Japanese Patent Publn. No. 27302/1990 discloses a process for preparing pitch for carbon materials, which comprises subjecting powdered pitch or fibrous pitch to oxidizing treatment, and molding the oxidized pitch under a molding pressure of 100–500 kg/cm$^2$G into a desired form, followed by carbonization. In the process for preparing the pitch disclosed in this publication, however, the oxidation treatment employed, to which the powdered or fibrous pitch is subjected, is limited only to the vapor phase oxidation.

According to the process comprising the vapor phase oxidation of molten pitch as illustrated above, there was a limit to the use of the resulting oxidized pitch as a carbonaceous material, particularly as the pitch for matrix of carbon material, because no uniform pitch could be obtained owing to a slow oxidation reaction of the pitch, and when the vapor phase oxidation reaction temperature was elevated in order to accelerate the oxidation reaction of the pitch, a thermopolymerization of the pitch took place concurrently therewith, and hence the resulting oxidized pitch was found poor in flowability.

In the process for the vapor phase oxidation of pitch in its powdered or fibrous state, it is presumed that the oxidation reaction proceeds up to the interior of the powder or fiber, and the pitch comes to decrease in its flowability even when it is in a heated state, and hence it is considerably difficult to increase the carbonization yield of the pitch while keeping flowability of said pitch being oxidized.

Further, it is also known to obtain pitch for carbon material by liquid phase oxidation of a mesophase or coke. In this process, however, there is involved such a problem that this process is low in economical efficiency, because this liquid phase oxidation is prone to ununiformity, and for obtaining a uniform oxidized pitch, the liquid phase oxidation treatment for an extended period of time is required.

With the view of solving the above-mentioned problems, the present inventors prosecuted extensive researches and have accomplished eventually the present invention on the basis of their findings that a pitch having a low softening point and an optical isotropy is formed in advance into a fibrous form and the thus treated pitch may be nitrated in a short period of time even at a low reaction temperature by liquid phase nitration with a nitration reagent containing an acid catalyst and, as the result, the thus nitrated pitch is high in thermal reactivity, and hence the thermopolymerization reaction of the nitrated pitch can proceed with a low energy and, moreover, that because the nitrated pitch is thermopolymerized without evaporation of low molecular weight components at the time of thermopolymerization of the pitch, the carbonization yield of the pitch increases, and the nitrated pitch thus obtained is low in softening point and excellent in moldability and impregnability as matrix for various composite materials.

OBJECT OF THE INVENTION

The present invention is intended to solve such problems associated with the prior art as mentioned above, and an object of the invention is to provide a process for preparing a pitch for matrix, said pitch for matrix being capable of carbonization with a low energy and a high carbonization yield, capable of preparing uniform carbon materials, being low in softening point and easily moldable and, moreover, excellent in impregnability.

SUMMARY OF THE INVENTION

The process for preparing a pitch for matrix of the present invention is characterized in that an optically isotropic pitch is melt spun to form a fibrous pitch, and the fibrous pitch thus obtained is nitrated with a nitration reagent in the presence of an acid catalyst.

In the present invention, it is desirable that the fibrous pitch to be nitrated has a diameter of not more than 20 μm, the nitration reagent is nitric acid, and the acid catalyst is sulfuric acid.

According to the invention, there can be prepared a uniform pitch for matrix high in thermal reactivity by melt spinning an optically isotropic pitch into a fibrous pitch, and nitrating the fibrous pitch thus obtained by means of a nitration reagent in the presence of an acid catalyst.

DETAILED DESCRIPTION OF THE INVENTION

The process for preparing a pitch for matrix of the present invention is illustrated below in detail.

In the process for preparing a pitch for matrix according to the invention, an optically isotropic pitch is melt spun, according to the usual way, into a fibrous pitch large in specific surface area, and the fibrous pitch thus obtained is nitrated by means of a nitration reagent in the presence of an acid catalyst to convert into a pitch having a high thermal reactivity.

By "pitch high in thermal reactivity" as used in the present specification is meant such pitch as having a thermopolymerization initiation temperature as measured by a differential scanning calorimeter (DSC) lower by 10°-100° C. than that of the starting optically isotropic pitch prior to nitration thereof.

According to the vapor phase oxidation of the starting pitch known per se, it was difficult to perform an effective and uniform oxidation, because said starting pitch must be heat treated at a high temperature and consequently the pitch begins to melt. In contrast thereto, according to the present invention, an optically isotropic pitch is nitrated in a liquid phase by means of a nitration reagent containing an acid catalyst, and hence even an optically isotropic pitch having a low softening point can be treated, thus it becomes possible to nitrate uniformly the starting pitch formed into a fibrous pitch, as it is, at a low temperature and in a short period of time.

Further, because of its high thermal reactivity, the nitrated pitch thus obtained increases in carbonization yield, and because of its low softening point, the nitrated pitch is useful with ease as an impregnant, for example, for use in impregnating carbonaceous materials therewith, thus the nitrated pitch is suitable for use in the preparation of composite materials.

Furthermore, when the starting pitch is oxidized in a liquid phase by means of an oxidizing liquid conventionally used, such as sulfuric acid or nitric acid, it is difficult to perform a uniform oxidation of said starting pitch within an ordinary operation time, whereas in the present invention, the inventors' attention has been paid to the use of a nitration reagent in combination of an acid catalyst in the nitration of the starting pitch, with the result that it has become possible to perform the nitration of the starting pitch at a low temperature and in a short period of time by means of a combination of the nitration reagent and acid catalyst mentioned above.

A. Optically Isotropic Pitch

The optically isotropic pitch used in the present invention is prepared, according to the usual way, from petroleum pitch, coal pitch, etc. through treatment steps such as filtration, purification, distillation, hydrogenation, catalytic cracking, etc.

By "an optically isotropic pitch" as used in the present specification is meant a pitch that is optically isotropic, or a pitch whose optical anisotropy is less than 50%, preferably less than 30%, when it is observed by means of a polarization microscope.

Desirably, the optically isotropic pitch used in the present invention as the starting material has its softening point of not more than 200° C., preferably not more than 170° C.

From the optically isotropic pitch having such low softening point as mentioned above, there can be prepared a nitrated pitch for matrix having a low softening point.

However, commonly used optically isotropic pitch having a relatively high softening point such as higher than 200° C. can also be used in the present invention in the same way as mentioned above.

In the present invention, moreover, a nitration reaction in a liquid phase can be performed at a temperature of about room temperature, and hence even optically isotropic pitch having a low softening point, for example, not more than 100° C., can be used as the starting pitch.

B. Fibrous Pitch

In the present invention, the optically isotropic pitch as mentioned above is molded into a fibrous pitch, followed by nitration. In molding the optically isotropic pitch into a fibrous form, any molding techniques may be employed so long as the optically isotropic pitch is formed thereby into a fibrous optically isotropic pitch. The fibrous pitch to be nitrated is desirably small in diameter and large in specific surface area, if possible, so that the fiber surface is sufficiently nitrated, from the standpoint of acceleration of the nitration reaction. The diameter of the fibrous pitch is desirably not more than 20 μm, preferably not more than 16 μm.

C. Nitration

The optically isotropic pitch molded into the fibrous form in such a manner as mentioned above is then nitrated in a liquid phase.

In the present invention, it is desirable to nitrate the fibrous pitch to such an extent that the infusibilization of the pitch does not progress too much. This is because, if the fibrous pitch is nitrated excessively, the resulting nitrated pitch becomes infusible, whereby the thus nitrated pitch becomes difficult to handle as pitch for matrix.

The liquid phase nitration of the optically isotropic fibrous pitch of the present invention may be carried out by bringing said fibrous pitch into contact at a relatively low temperature with a nitrating solution (preferably an aqueous solution) containing an acid catalyst of given concentration and a nitration reagent.

The acid catalysts usable in the present invention are not particularly restricted so long as they are in a liquid state. The acid catalysts include, for example, inorganic strong acid such as sulfuric acid, hydrochloric acid and phosphoric acid; organic strong acid such as p-toluenesulfonic acid, etc.; Lewis acid such as boron trifluoride and aluminum chloride; inorganic weak acid such as carbonic acid and boric acid; and organic weak acid such as acetic acid, propionic acid and butyric acid. Of these acid catalysts exemplified above, preferred is sulfuric acid because of its high catalytic activity to nitration reaction and water-solubility.

Used in the present invention as the nitration reagent is typically nitric acid. However, there may also be used nitrates such as sodium nitrate, potassium nitrate, etc. organic nitric acid esters and nitrous acid.

The amounts of the acid catalyst and the amounts of the nitration reagent used are not particularly restricted if the liquid phase nitration of the optically isotropic pitch smoothly proceeds by the catalysis of the acid catalyst. Generally, however, these amounts may suitably be changed according to the kind of the optically isotropic pitch used, and to the shape and diameter of the fibrous pitch used.

Concretely, the concentration in the liquid phase of the nitration reagent is generally more than 2N, preferably from 5 to 10N, and that of the acid catalyst is desirably from 0.2 to 1.0 mol/L.

If the concentration of the nitration reagent used is less than 2N, the nitration reaction does not sometimes proceed sufficiently, and if said concentration used exceeds 10N, the nitration reaction sometimes proceeds excessively.

The nitration of the fibrous pitch needs to be carried out, while the fibrous pitch having an optical isotropy is retaining its shape, as it is. The nitration temperature employed is preset, taking the productivity into account, and generally is from room temperature to a temperature up to the softening point of the optically isotropic pitch, preferably from room temperature to about 100° C. The nitration time employed is from 15 minutes to 5 hours, preferably from 15 minutes to about 1 hour.

If the reaction temperature employed exceeds the softening point of the optically isotropic fibrous pitch used, no nitration as expected can be accomplished, because when nitrating the pitch, the pitch cannot retain its fibrous form and sometimes melts, whereby the surface area of the pitch sharply decreases.

In practicing the nitration in a liquid phase of the fibrous pitch, the nitrating liquid may be incorporated with small amounts of various alcohols, low boiling silicone oil, various surfactants and emulsifier such as polyethylene glycol in order to improve the wetting between the nitrating liquid containing nitric acid and the acid catalyst, and the fibrous pitch, that is, so that the fibrous pitch will not be afloat on the surface of said nitrating liquid.

The liquid phase nitration reaction of the fibrous pitch may be carried out continuously after the optically isotropic pitch has been molded into the fibrous form, or may be carried out by another process after the fibrous pitch has been once in preparation. The nitration reaction of such fibrous pitch may be carried out usually by the batchwise or continuous operation.

The nitrated fibrous pitch thus obtained is high in thermal reactivity as mentioned above and has a thermopolymerization initiation temperature as measured by DSC lower by 10°–100° C. than that of the starting optically isotropic pitch prior to nitration thereof.

In the present invention, if necessary, the nitrated fibrous pitch may be then subjected to dry treatment and/or polymerization treatment in the air at room temperature or under application of heat.

Further, it is also possible that the nitrated fibrous pitch is subjected, if necessary, to alkali washing treatment, thereby substituting the nitro group on the surface of the nitrated fibrous pitch with other functional group.

The nitrated pitch for matrix thus obtained in the above-mentioned manner is useful for matrix of carbon composite material by impregnating the nitrated pitch to carbon fibers, carbon nonwoven fabrics or porous carbon materials.

D. Molding, Carbonization and Graphitization

The nitrated fibrous pitch prepared in the manner as mentioned above may easily be molded into such a molded product as pellet useful as matrix by means of an extruder, if said nitrated fibrous pitch has such a low softening point as particularly not more than 200° C., preferably not more than 170° C.

That is, the nitrated fibrous pitch is generally low in softening point, excellent in flowability and extremely useful as pitch for matrix of a carbon material, and is used in its form, as it is, in the form of a molded product or in the form of various composite materials impregnated therewith. The nitrated fibrous pitch thus used is then heated to be carbonized or graphitized to give a carbon material.

The nitrated fibrous pitch obtained according to the present invention is high in thermal reactivity, and on that account, a thermopolymerization reaction thereof proceeds at low temperatures in the heating process, and the pitch is polymerized in the thermopolymerization process without evaporation of low molecular weight components, and hence the carbonization yield of said pitch can be increased.

In practicing the thermopolymerization process (carbonization or graphitization process), various reaction conditions may be selected according to the purposes for which the resulting carbonaceous materials are used. Generally, the thermopolymerization process is carried out by heating the molded product of the nitrated pitch or the composite material impregnated with the nitrated pitch in the presence of an inert gas such as nitrogen gas or argon gas at 400°–3,000° C., preferably 700°–2,500° C. at a heating rate of 5°–100° C./min.

EFFECT OF THE INVENTION

In the process for preparing the pitch for matrix relying conventional vapor phase oxidation, such high reaction temperature as 200°–400° C. are required, and hence pitch having a softening point of not more than 200° C., particularly optically isotropic pitch is oxidized in its molten state and therefore it was difficult to perform oxidation of the pitch efficiently and uniformly.

In the present invention, however, the starting pitch is formed into fiber so as to have increased surface area, and the fibrous pitch is nitrated in a liquid phase by bringing said pitch into contact with the nitration reagent containing the acid catalyst, and hence even optically isotropic pitch having low softening point may be nitrated uniformly and efficiently at low temperature and in a short period of time.

As the result, the nitrated pitch thus obtained becomes high in thermal reactivity, and can be carbonized with a low energy. Therefore, the carbonization yield thereof becomes high. Further, the nitrated pitch is low in softening point, excellent in flowability at the time of heating, easy of molding and excellent in impregnability. The nitrated pitch high in thermal reactivity is very useful as matrix for various composite materials.

EMBODIMENT OF THE INVENTION

The present invention is illustrated with reference to the following examples, but the invention is in no way limited to those examples.

EXAMPLE 1

An optically isotropic petroleum pitch having a softening point as measured by a flow tester of 137° C. was spun according to the melt spinning process at a spinneret temperature of 170° C. and a take-up speed of 170 m/min to obtain a fibrous pitch having a fiber diameter of 15 μm.

Separately, a liquid phase nitration bath charged with 200 ml of an aqueous solution having a nitric acid concentration of 5 N and a sulfuric acid concentration of 0.5 mol/L was prepared.

In the nitration bath prepared above was immersed 2 g of the above-mentioned fibrous pitch at room temperature for 3 hours to obtain a nitrated pitch at a reaction yield of 105.3% by weight.

The nitrated pitch thus obtained was taken out of the nitration bath, followed by water-washing and drying. The thus obtained pitch had a softening point of 170° C. The differential scanning calorie determination of the said nitrated pitch was carried out, whereupon the endothermic peak which is the initiation point of the thermopolymerization reaction appeared at 395° C.

The said pitch was heated up to 800° C. in a nitrogen stream at a heating rate of 10° C./min, whereby a carbon material was obtained at a carbonization yield of 69.4% by weight (73.1% by weight based on the fibrous pitch).

COMPARATIVE EXAMPLE 1

A fibrous pitch was obtained in the same manner as Example 1.

Subsequently, this fibrous pitch was heated immediately, without subjecting to liquid phase nitration, in the nitrogen stream up to 800° C. at a heating rate of 10° C./min, whereby a carbon material was obtained at a carbonization yield of 50.8% by weight. The differential scanning calorimetry of the fibrous pitch was carried out, whereby the endothermic peak appeared at 441° C.

EXAMPLE 2

An optically isotropic petroleum pitch having a softening point as measured by a flow tester of 80° C. was spun according to the melt spinning process at a spinneret temperature of 110° C. and a take-up speed of 170m/min to obtain a fibrous pitch having a fiber diameter of 15μm.

Subsequently, a liquid phase nitration bath charged with 200 ml of an aqueous solution having the nitric acid concentration of 8.0N and the sulfuric acid concentration of 0.5 mol/L was prepared.

In the nitration bath prepared above was immersed 2g of the above-mentioned fibrous pitch at room temperature for 3 hours to obtain a nitrated pitch at a reaction yield of 117.5% by weight. This nitrated pitch was taken out, followed by water-washing and drying. The pitch thus obtained had a softening point of 150° C.

This nitrated pitch was heated up to 800° C. in a nitrogen stream at a heating rate of 10° C./min, whereby a carbon material was obtained at a carbonization yield of 70.3% by weight (62.6% by weight based on the fibrous pitch).

COMPARATIVE EXAMPLE 2

Following the same procedure as in Example 2, a fibrous pitch was obtained.

Subsequently, this fibrous pitch was heated immediately, without subjecting to liquid phase nitration, in the nitrogen stream up to 800° C. at a heating rate of 10° C./min, whereby a carbon material was obtained at carbonization yield of 22.8% by weight.

EXAMPLE 3

A UD substrate formed from uni-directionally arranged petroleum pitch based carbon fibers was impregnated with the nitrated pitch prepared in Example 1 at a temperature of 250° C. and a pressure of 10 mmHg to obtain a molded product containing 60% by weight of the carbon fibers.

The molded product was carbonized at 2,300° C. in an argon stream, whereby a carbon/carbon (c/c) composite having a tensile strength of 350 MPa and a tensile modulus of 200 GPa was obtained.

COMPARATIVE EXAMPLE 3

Preparation of the c/c composite was tried in the same manner as in Example 3 by using an optically isotropic petroleum pitch having a softening point of 137° C. used in Example 1 without subjecting to nitration, but it was too low in carbonization yield to obtain such c/c composite as aimed at.

EXAMPLE 4

An optically isotropic petroleum pitch having a softening point as measured by a flow tester of 137° C. was spun according to a melt blowing process at a spinneret temperature of 170° C. the gas temperature of 170° C. and a gas ejection speed of 120 m/sec to obtain a fibrous pitch having a fiber diameter of 15 μm.

Separately, a liquid phase nitration bath charged with 200 ml of an aqueous solution having a nitric acid concentration of 5.0 N and a sulfuric acid concentration of 0.1 mol/L was prepared.

In the nitration bath prepared above was immersed 2 g of the above-mentioned fibrous pitch at room temperature for 3 hours to obtain a nitrated pitch at a reaction yield of 105.3% by weight.

The said pitch was heated up to 800° C. in a nitrogen stream at a heating rate of 10° C./min, whereby a carbon material at a carbonization yield of 69.4% by weight (73.1% by weight based on the fibrous pitch).

EXAMPLE 5

An optically isotropic petroleum pitch having a softening point as measured by a flow tester of 63° C. was spun according to a melt blowing process at a spinneret temperature of 150° C., the gas temperature of 65° C. and a gas ejection speed of 120 m/sec to obtain a fibrous pitch having a fiber diameter of 15 μm.

Subsequently, a liquid phase nitration bath charged with 200 ml of an aqueous solution having the nitric acid concentration of 8.0 N and the sulfuric acid concentration of 0.1 mol/L was prepared.

In the nitration bath prepared above was immersed 2g of the above-mentioned fibrous pitch at room temperature for 3 hours to obtain a nitrated pitch at a reaction yield of 117.5% by weight. This pitch was taken out, followed by water-washing and drying.

This nitrated pitch was heated up to 800° C. in a nitrogen stream at a heating rate of 10° C./min, whereby a carbon material at a carbonization yield of 70.3% by weight (82.6% by weight based on the fibrous pitch).

What is claimed is:

1. A process for preparing a pitch for matrix, which process comprises melt spinning an optically isotropic pitch to form a fibrous pitch, and nitrating the fibrous pitch thus obtained with a nitration reagent in the presence of an acid catalyst.

2. The process for preparing the pitch for matrix as claimed in claim 1 wherein the fibrous pitch has a diameter of not more than 20μm.

3. The process for preparing the pitch for matrix as claimed in claim 1 wherein the nitration reagent is nitric acid and the acid catalyst is sulfuric acid.

4. The process for preparing the pitch for matrix as claimed in claim 1 wherein the nitration is carried out under conditions of reaction temperature, reaction time and concentration in a liquid phase such that the reaction temperature is from room temperature to the softening point of the optically isotropic pitch, the reaction time is from 15 minutes to 5 hours, and the concentration in the liquid phase of the nitration reagent and of the acid catalyst is 2–10 N and 0.2–1.0 mol/L, respectively.

* * * * *